United States Patent [19]

Kamada

[11] Patent Number: 4,626,187
[45] Date of Patent: Dec. 2, 1986

[54] APPARATUS FOR PREPARING A SYNTHETIC RESIN PLATE OF DIFFERENT COLORS

[75] Inventor: Isao Kamada, Otake, Japan

[73] Assignee: Mitsubishi Rayon Company Ltd., Tokyo, Japan

[21] Appl. No.: 620,032

[22] Filed: Jun. 13, 1984

[30] Foreign Application Priority Data

Jun. 29, 1983 [JP] Japan .................. 58-116048

[51] Int. Cl.⁴ ............................................ B29C 47/04
[52] U.S. Cl. .................... 425/131.1; 264/75;
264/171; 264/236; 264/245; 264/347;
425/133.5; 425/199; 425/325; 425/371;
425/462
[58] Field of Search ................ 264/75, 171, 245, 236,
264/347; 425/131.1, 133.5, 132, 198, 462–463,
199, 325, 371

[56] References Cited

U.S. PATENT DOCUMENTS

| | | | |
|---|---|---|---|
| 2,174,779 | 10/1939 | Delorme | 264/75 |
| 2,332,829 | 10/1943 | Parsons et al. | 264/171 |
| 2,479,261 | 8/1949 | Reetz | 425/462 |
| 2,815,532 | 12/1957 | Braunlich | 425/463 |
| 3,488,246 | 1/1970 | Duggins | 264/75 |
| 3,592,882 | 7/1971 | Morita | 264/108 |
| 3,706,825 | 12/1972 | Hall et al. | 264/75 |
| 3,779,676 | 12/1973 | Bernard | 425/131.1 |
| 4,254,074 | 3/1981 | Toyooka et al. | 264/171 |
| 4,302,497 | 11/1981 | Toyooka et al. | 264/171 |
| 4,415,509 | 11/1983 | Toyooka et al. | 264/171 |

Primary Examiner—Jeffery Thurlow
Attorney, Agent, or Firm—Oblon, Fisher, Spivak, McClelland & Maier

[57] ABSTRACT

A synthetic resin plate having at least two different colors is prepared by a process having the steps of supplying at least two polymerizable liquid materials differing in the color from at least two inlets, passing them through at least two groups of flow paths alternately arranged, extruding and injecting the polymerizable liquid materials into a polymerization apparatus, polymerizing the liquid materials, and withdrawing a plate-shaped product having a striped pattern extending from the surface to the interior or a plate-shaped product having said striped pattern in which the boundary area between the adjacent stripe lines of different colors is gradated.

3 Claims, 10 Drawing Figures

Fig. 5A
Fig. 5B
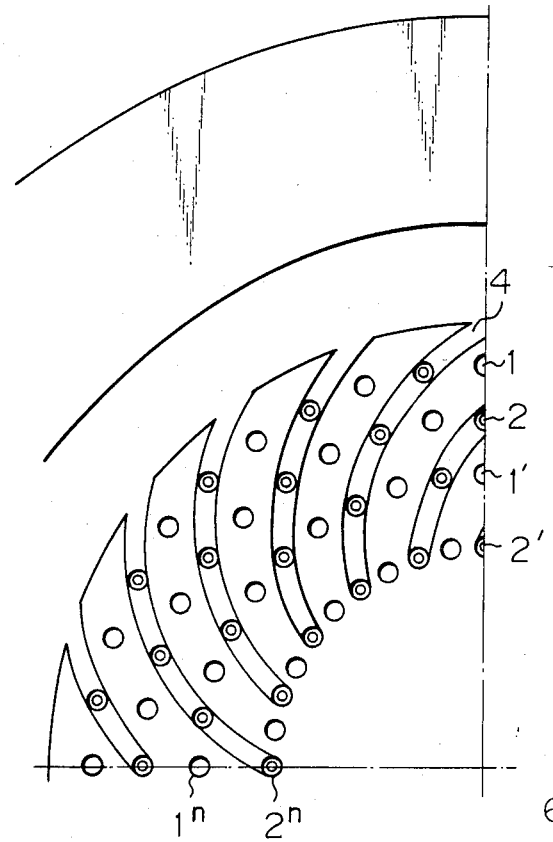
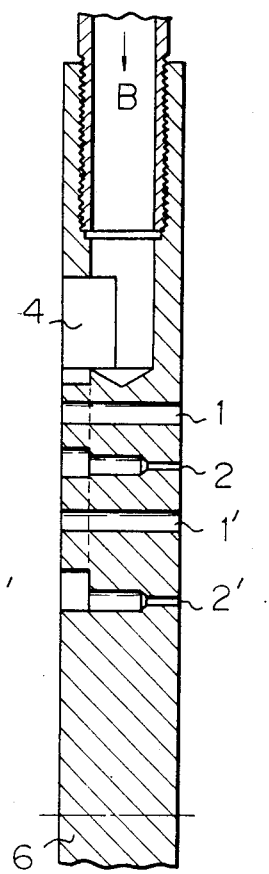

APPARATUS FOR PREPARING A SYNTHETIC RESIN PLATE OF DIFFERENT COLORS

BACKGROUND OF THE INVENTION

1. Field of the Invention

The present invention relates to a process and apparatus for the preparation of a synthetic resin plate having at least two different colors. More particularly, it relates to a process and apparatus for the preparation of a synthetic resin plate having different colors, which comprises supplying a plurality of polymerizable liquid materials differing in color from at least two inlets, passing them through at least two groups of flow paths alternately arranged, extruding and injecting the polymerizable liquid materials into a polymerization apparatus, polymerizing the liquid materials, and withdrawing a plate-shaped product. The resulting product has a striped pattern extending from the surface to the interior or a striped pattern in which the boundary area between the adjacent stripe lines of different colors is gradated.

2. Description of the Prior Art

A plate of different colors having a color pattern only on the surface thereof has been known, and plates of this type are prepared according to various processes. For example, there can be mentioned a process in which a plate is formed and a pattern is printed on the plate by using paints differing in color, and a process in which a film having a color pattern printed thereon is bonded to a plate. Furthermore, plates of different colors in which the boundary area of the color pattern is gradated can be prepared according to a process in which paints differing in hue are applied to the surface of a plate by printing, spraying or dyeing or a process in which a film colored by printing, spraying or dyeing is bonded to the surface of a plate. However, these conventional plates of different colors are inferior as to durability and are defective in that the surface color film can be peeled from the surface of the plate by an external force or with the lapse of time. Moreover, when such a plate is subjected to heating or drawing processing, wrinkles are formed because of differences in the stretchability between the surface color film and the core plate, or the color is thinned in the drawn portion and the color difference between the drawn portion and the undrawn portion becomes prominent, resulting in a reduction of the aesthetic effect.

Plates of different colors having a color pattern extending from the surface to the interior are disclosed in U.S. Pat. Nos. 3,488,246, 3,529,325, 3,526,378, 3,570,056, 3,706,825 and 4,232,078. According to the teachings of these U.S. patents, a polymerizable liquid material including a filler and a colorant and having a high viscosity are appropriately mixed together by a three-stage mixing apparatus and the polymerizable liquid material is polymerized and cured to obtain an opaque plate-shaped product having a pattern resembling a marble pattern. The characteristic feature of this preparation process resides in appropriate mixing, and the pattern is changed according to the concentration, viscosity and flow rate of the starting material and the state of the mixer. Therefore, the probability of formation of a predictable pattern on the surface of the plate is low. It is thus difficult to produce an aesthetic color pattern with a good reproducibility.

The technique disclosed in U.S. Pat. No. 4,232,078 is one developed by the inventor of the present invention. According to the technique of this patent, at least two polymerizable liquid materials differing in color are injected into a polymerization apparatus and are polymerized and cured to gradate the boundary area between the two liquids. In a plate of different colors prepared according to this process, the hue is changed only in the direction of the width but the hue is substantially uniform in the direction of the thickness. Accordingly, the formed pattern is relatively monotonous and lacks depth.

SUMMARY OF THE INVENTION

It is a primary object of the present invention to provide a plate of different colors having a deep appearance in which the hue is changed not only in the direction of the width but also in the direction of the thickness by improving the technique disclosed in U.S. Pat. No. 4,232,078. That is, the invention provides a plate of different colors having a deep pattern of a plurality of lines extending from the surface to the interior or such a deep line pattern in which the boundary area is gradated.

In accordance with the present invention, there is provided a process for the preparation of a synthetic resin plate having different colors, which comprises supplying at least two polymerizable liquid materials differing in the color from at least two inlets, passing them through at least two groups of flow paths alternately arranged, extruding and injecting the polymerizable liquid materials into a polymerization apparatus polymerizing the liquid materials and withdrawing a beautiful plate-shaped product having a striped pattern extending from the surface to the interior, or a beautiful plate-shaped product having the striped pattern in which the boundary area between the adjacent stripe lines of different colors is gradated.

BRIEF DESCRIPTION OF THE DRAWINGS

Various other objects, features and attendant advantages of the present invention will be more fully appreciated as the same becomes better understood from the following detailed description when considered in connection with the accompanying drawings in which like references characters designate like or corresponding parts throughout the several views, and wherein:

FIGS. 5A and 5B are plan and sectional views showing a part of the plate 6 shown in FIG. 3;

DESCRIPTION OF THE PREFERRED EMBODIMENTS

Figure 1:
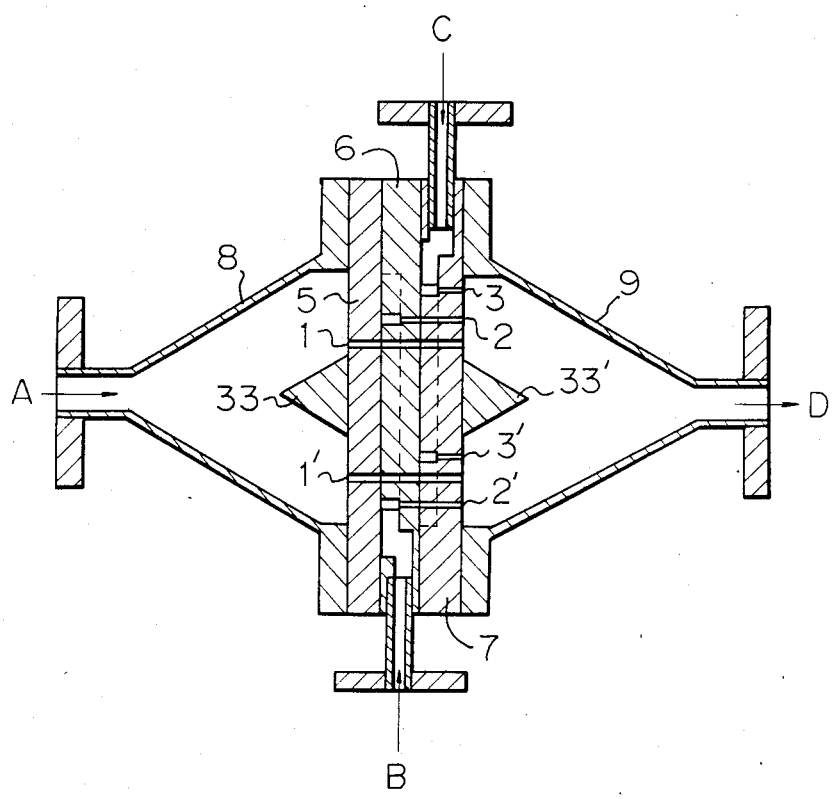
FIG. 1 is a longitudinally sectional view illustrating an embodiment of the apparatus for combining three polymerizable liquid materials differing in the color, in which three groups of extrusion openings are arranged.

The synthetic resin plate having different colors according to the present invention may be preferably used as a surface decorating plate for a sanitary article such as a bathtub or a washstand and for room furniture, display stands and various partitions.

The polymerizable liquid material used in the present invention is a polymerizable starting material comprising at least one monoethylenically unsaturated compound or polyfunctional compound, which is liquid under the normal pressure. As the monoethylenically unsaturated compound, there can be mentioned, for example, methacrylates such as methyl methacrylate, ethyl methacrylate, butyl methacrylate, cyclohexyl methacrylate and benzyl methacrylate, styrene, and halogen-substituted derivatives (such as chlorostyrene) and alkyl-substituted derivatives (such as α-methylstyrene) of styrene. Furthermore, a mixture comprising a substantial amount of such a methacrylate as mentioned above and an acrylate such as methyl acrylate as mentioned above and an acrylate such as methyl acrylate, ethyl acryate, butyl acrylate or 2-ethylhexyl acrylate, vinyl acetate, acrylonitrile or a derivative thereof may be used. As the polyfunctional compound, there can be mentioned, for example, glycol dimethacrylate, triallyl cyanurate, triallyl isocyanurate, poly(ethylene glycol) acrylate, poly(ethylene glycol) methacrylate, allyl acrylate, allyl methacrylate, divinylbenzene, diallyl methacrylate, diallyl phthalate and diethylene glycol bis-allylcarbonate. A mixture of methyl methacrylate as the main component and a comonomer copolymerizable therewith is most preferably used as the polymerizable liquid material in the present invention.

A polymerization initiator is ordinarily incorporated into the polymerizable liquid material. For example, there may be used free radical polymerization initiators such as azobisisobutyronitrile, azobisdimethylvaleronitrile, benzoyl peroxide, lauroyl peroxide, acetyl peroxide, capryl peroxide, 2,4-dichlorobenzoyl peroxide, isopropyl peroxydicarbonate, isobutyl peroxide and acetylcyclohexylsulfonyl peroxide. Two or more or these initiators may be simultaneously used.

A mixture of a monomer and a polymer may be used as the polymerizable liquid material, so far as the flowability is not lost. More specifically, there can be used a mixture formed by dissolving or suspending an appropriate amount of a polymer into a monomer such as mentioned above and monomer/polymer mixture obtained by partial polymerization. Various additives such as a stabilizer, a plasticizer, a polymerization regulator, a parting agent and a viscosity modifier may be added to the polymerizable liquid material, so far as polymerization is not extremely inhibited.

The polymerizable liquid materials differing in color, which are used in the present invention, are polymerizable liquid materials differing in hue and/or saturation within the range covering colorless transparency, semitransparency and opacity. Dyes, pigments and coloring assistants used for the production of the polymerizable liquid materials differing in color may be selected from known products. When a transparent colored synthetic resin plate is prepared, at least one dye or a dispersion of at least one pigment in a dispersion medium is incorporated. When a semitransparent or opaque colored synthetic resin plate is prepared, a powdery or pasty pigment or dye is used. A granular processed pigment prepared by dispersing a pigment in the polymerizable liquid material, for example, methyl methacrylate or monomeric styrene, at a high concentration, adding a polymerization initiator to the dispersion, polymerizing the monomer and pulverizing the obtained colored polymer may be used as the pigment. This granular processed pigment is especially preferably used in the present invention. There may be adopted a simple method in which a powdery or pasty pigment is directly added to the polymerizable liquid material. In this case, however, color unevenness is caused by agglomeration or precipitation of the pigment, or uneven polymerization is caused by the activity of the pigment, resulting in a reduction of the quality or appearance of the product. In order to control the degree of transparency in a semitransparent product, it is preferred that an appropriate amount of a copolymer of methyl methacrylate and styrene prepared in advance be dissolved as the coloring assistant in the polymerizable liquid material to maintain the quality at a certain level. According to another method, an appropriate amount of monomeric styrene is added to the polymerizable liquid material.

In the present invention, at least two polymerizable liquid materials differing in color are prepared according to the above-mentioned method. In the case where a dye is used as the colorant, it is preferred that the viscosities of the polymerizable liquid materials be controlled within the range of from 5 to 30 P (poise) at 20° C. and the difference of the viscosity between the polymerizable liquid materials differing in color be not larger than 8 P. In the case where a pigment is used as the colorant, it is preferred that the viscosities of the polymerizable liquid materials be controlled within the range of from 3 to 30 P and the difference of the viscosity between the polymerizable liquid materials be not larger than 10 P.

For the production of a plate-shaped product having a striped pattern or a striped pattern in which the boundary area between the adjacent stripe lines of different colors is gradated according to the present invention, there may be adopted a process in which at least two groups of extrusion openings differing in sectional area and/or the number of the extrusion openings are alternately arranged, the polymerizable liquid materials colored in different hues are extruded at the same or different speeds from the respective groups of extrusion openings and are injected into a continuous polymerization apparatus of the confronting belt type for preparing and molding a resinous plate and the polymerizable liquid materials are polymerized. The striped pattern is formed when the polymerizable liquid materials are extruded from the respective groups of extrusion openings arranged alternately. The stripe line number and thickness of the striped pattern are determined by appropriately setting the sectional area and number of the extrusion openings. While polymerization is advanced in the continuous polymerization apparatus, the confronting belts are pressed by supporting rollers and the liquid materials differing in color are slightly mingled and diffused in the boundary area by the expanding force due to the weight and rigidity of the belts, with the result that the boundary area becomes gradated. The degree of gradation can be reduced by adjusting the viscosities of the liquid materials to 20 to 30 P and controlling the difference of the viscosity to 0 to 5 P. The degree of gradation can be increased by adjusting the viscosities of the liquid materials to 3 to 30 P and controlling the difference of the viscosity to 5 to 10 P, and the effect is enhanced by the addition of a surface active agent.

A striped pattern having thick and thin portions may be formed by injecting the polymerizable liquid materials differing in the color into a polymerization apparatus while extruding them at the same or different speeds.

In the at least two groups of extrusion openings used in the process of the present invention, the total sectional area and sectional area of a single extrusion opening are not critical. In carrying out the process of the present invention, however, it is preferred that the sectional area be in the range of from 1 to 300 mm$^2$. The sectional area ratio between the groups of extrusion openings may be in the range of from 1:99 to 99:1. The number of extrusion openings in each group may be 1 or an optional larger number, but in view of formation of the intended linear pattern of the present invention, it is preferred that the number of extrusion openings of each group be 5 to 500. The liquid materials are extruded from these extrusion openings in an amount corresponding to the capacity of the polymerization apparatus of the confronting belt type, that is, in an amount of 3 to 30 l/min, and the flow rate of each liquid material is adjusted to 0.1 to 10 m/min. In view of formation of the intended linear pattern, it is prefered that the ratio of the flow rates between the liquid materials be in the range of from 1:1 to 1:20.

In carrying out the process of the present invention, the amount of polymerization initiator added for completion of polymerization of the liquid material is preferably adjusted to 0.05 to 0.3% in case of benzoyl peroxide or 0.02 to 0.2% in case of azobismethylvaleronitrile.

The process of the present invention will now be described in detail with reference to the accompanying drawings.

Figure 3:
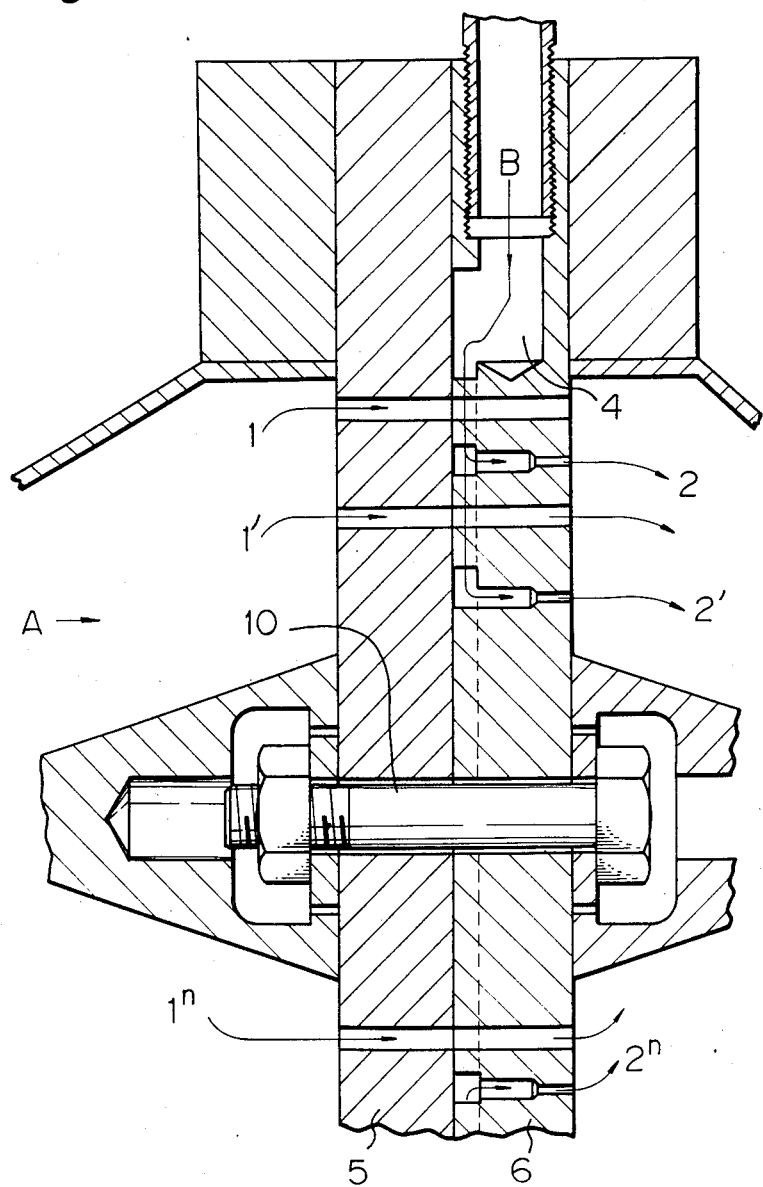
FIG. 3 is a longitudinally sectional enlarged view illustrating an embodiment of the apparatus for combining two polymerizable liquid materials differing in color, in which two groups of extrusion openings are arranged.

FIG. 1 is a longitudinal sectional view illustrating an embodiment of the apparatus in which three groups of extrusion openings are arranged and three polymerizable liquid materials differing the color are combined. Plates 5, 6 and 7 are sandwiched together, as by bolts 10 (FIG. 3). A conical gate 8 is connected to an upstream surface of the plate 5 and a conical gate 9 is connected to a downstream surface of plate 7.

Polymerizable liquid materials differing in color are supplied at predetermined rates from inlets A, B and C, respectively, via metering pumps. The polymerizable liquid material supplied from the inlet A (hereinafter referred to as "liquid A") is guided to an outlet D through gate 8, extrusion openings 1, 1' ... 1$^n$ in plates 5-7 and gate 9. The polymerizable liquid material supplied from the inlet B (hereinafter referred to as "liquid B") is guided to the outlet D through extrusion openings 2, 2' ... 2$^n$ in plates 6 and 7 via the circumferential passage 4 and the spiral passages 2a in the plate 6. The polymerizable liquid material supplied from the inlet C (hereinafter referred to as "liquid C") is guided to the outlet D through extrusion openings 3, 3' ... 3$^n$ in plate 7 via the circumferential passage 4' and the spiral passages 3a in the plate 7. If spacers 33 and 33' are arranged on eigher side of the sandwich formed by plates 5-7, the liquid flows are effectively prevented from being disturbed. The liquid materials coming from the outlet D are injected into a polymerization device while the formed striped pattern is maintained.

Figure 2:
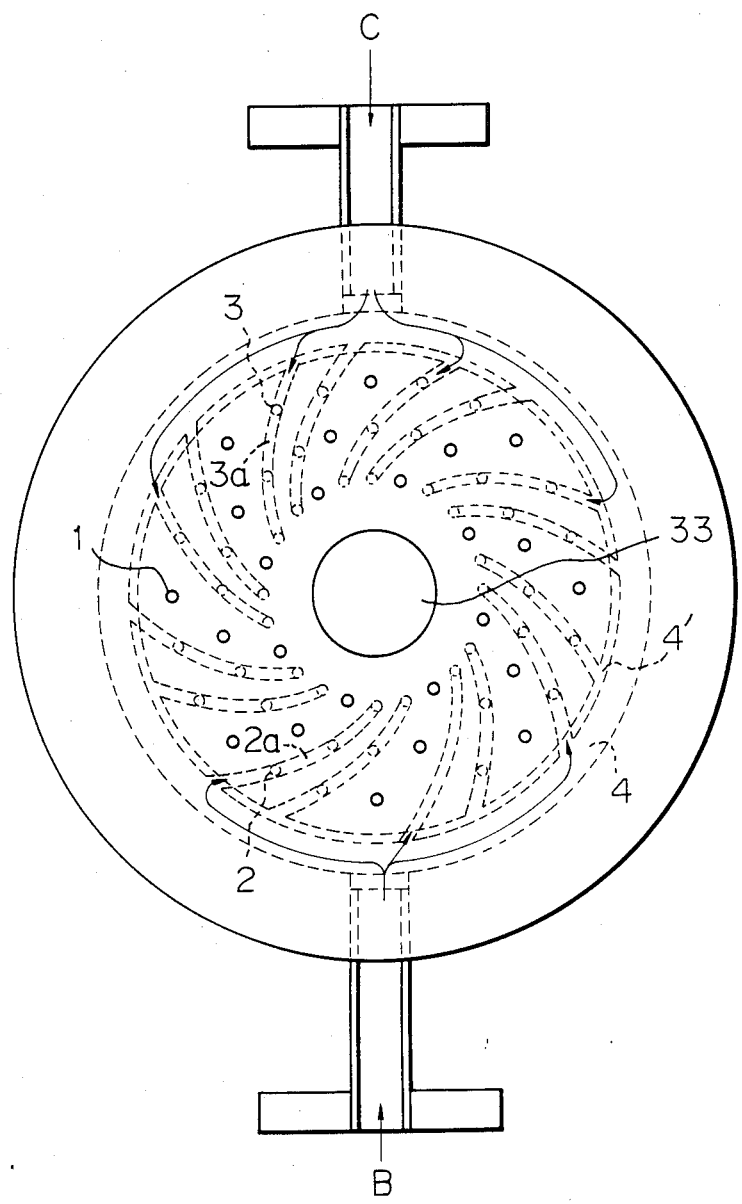
FIG. 2 is a side view illustrating the apparatus shown in FIG. 1.

FIG. 2 is a side view showing the groups of extrusion openings illustrated in FIG. 1. The liquid A passes through the first group of extrusion openings 1 in plates 5-7 from the left side face to the right side face in FIG. 1. The liquid B passes through the circumferential passage 4 from the inlet B and is distributed into the spiral passages 2a. The liquid B then passes through the second group of extrusion openings 2 formed in the spiral passages 2a and extending to the right in FIG. 1. The liquid C passes from inlet C through circumferential passage 4', additional spiral passages 3a, and then through the third group of extrusion openings 3 formed in the spiral passages 3a and extending to the right from in FIG. 1. Thus, the liquids A, B and C are combined and joined together while forming a striped pattern. The numbers and sizes of the extrusion openings 1, 2 and 3 of the first, second and third groups shown in FIG. 2 may be determined according to the intended configuration of the striped pattern. Furthermore, the flow amounts and rates of the liquids A, B and C may optionally be set. For example, when only the liquid C among the liquids A, B and C is extruded at a high speed from the extrusion openings, since the line of the liquid C draws a different locus, a complicated pattern can be effectively formed.

Figures 4A, 4B:
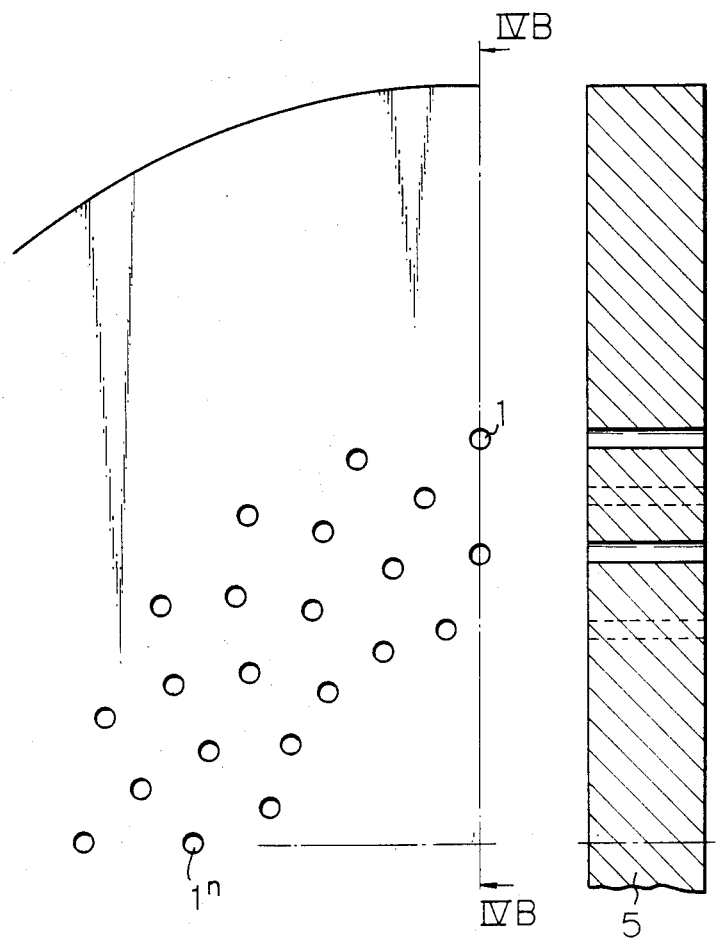
FIGS. 4A and 4B are plan and sectional views showing a part of the plate 5 shown in FIG. 3.

FIGS. 3, 4 and 5 show a combination of two groups of extrusion openings. FIG. 3 is an enlarged sectional view illustrating groups of extrusion openings in which liquids A and B are extruded from extrusion openings 1 to 1$^n$ and extrusion openings 2 to 2$^n$, respectively. FIGS. 4A and 4B are plan and sectional views illustrating a part of the plate 5 shown in FIG. 3. FIGS. 5A and 5B are plan and sectional views illustrating a part of the plate 6 shown in FIG. 3. Circular plates are shown in FIGS. 2, 4 and 5, but the plates that can be used in carrying out the present invention are not limited to such a circular plate. Referring to FIG. 3, the liquid B supplied from the inlet B passes through a passage 4 formed in the plate 6 and is extruded from extrusion openings 2 to 2$^n$. The liquid B is then combined with the liquid A extruded from extrusion openings 1 to 1$^n$ and in this way a striped pattern is formed.

Figure 6:
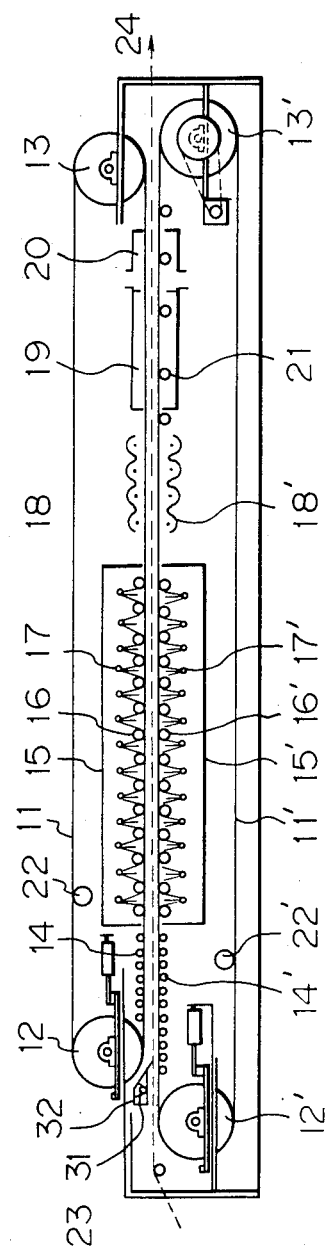
FIG. 6 is a front view illustrating an embodiment of the continuous plate-preparing apparatus, which is used in carrying out the process of the present invention.

FIG. 6 shows an embodiment of the continuous polymerization apparatus used in carrying out the process of the present invention. In FIG. 6, reference numerals 11 and 11' represent endless belts. Belts of a metal such as steel or stainless steel can be used as these belts. In order to obtain a plate excellent in surface appearance, these metal belts are carefully polished. The thickness of each metal belt is preferably 0.5 to 2 mm. The belts are respectively spread by main pulleys 12 and 13 and main pulleys 12' and 13' to produce a predetermined tension in each belt. It is known to connect hydraulic cylinders to the main pulleys 12 and 12' and to adjust tensions on the belts by changing the hydraulic pressure in the cylinders. In order to improve the shape of the belts and increase the thickness precision of the plate, it is preferred that the tensions on the belts be high, but ordinarily, the belts are operated under tensions of 3 to 15 Kg/cm$^2$. The belts are moved by driving the main pulley 13', and meandering of the belts is prevented by adjusting angles of the main pulleys 12 and 13 and the main pulleys 12' and 13'. The angles of the main pulleys can be adjusted by changing the hydraulic pressures of the cylinders or by other mechanical means. Meandering of the belts can also be prevented by changing the angles of rolls 22 and 22' contacted with the back surfaces of the belts.

The liquid materials are supplied from outlet D into a space between the confronting belts through a conduit 31 and an inclined plate 32 forming an injector. Injectors disclosed in Japanese Patent Publications No.

48-1276 and No. 48-16056 and Japanese Patent Application No. 52-38890 may be used for injection of the liquid materials. In order to prevent the linear pattern from being disturbed, in the process of the present invention, it is preferred that the injector be brought as close to the lower belt surface as possible while preventing the injector from contacting the lower belt surface.

Reference numerals 23 and 23' represent gaskets. The gaskets 23 and 23' travel with the belts in a state where the gaskets 23 (in FIG. 8) and 23' are each gripped between lateral edges of the confronting belts, whereby leakage of the liquid materials outside the belts is prevented. A gasket formed of soft polyvinyl chloride, polyethylene or the like material may be used, and a gasket having properties described in Japanese Patent Publication No. 47-49823 is preferably used.

Rolls 14, 14' and 16, 16' are arranged to support the confronting belts from the back surfaces thereof. The rolls 16 should be arranged so that the liquid materials do not leak outside from the space defined by the confronting belts and the gaskets in the heated polymerization zones 15 and 15'. The belts curve apart between adjacent rolls due to the hydraulic pressure of the liquid materials, the repulsive force of the gaskets and the weight of the belts. If the extent of this curvature is increased, the thickness precision of the plate-shaped product is reduced, and the linear pattern is disturbed with a resulting curve in the pattern lines or a change of the gradation state, resulting in a reduction of the aesthetic effect.

This trouble is overcome by controlling the curvature of the belts to a low level. As means for controlling curving of the belts, the distance between adjacent rolls is narrowed and the belt tension is increased. For this purpose, the distance between rolls is adjusted to about 20 to about 100 cm. The rolls are resiliently mounted so that even when the liquid materials are polymerized and contracted, the rolls are able to move in follow-up with this contraction and do not separate from the back surfaces of the belts. Instead of the above-mentioned roll system, there may be adopted a mechanism disclosed in Japanese Patent Publication No. 47-33498 as the means for supporting the belts. Spray devices 17 and 17' are arranged in the polymerization zone to apply warm water to the belts for heating the belts. A temperature lower than 100° C. may be used as the temperature of the warming water. Ordinarily, a temperature of 65° to 90° C. is adopted for the warming water. Infrared ray heaters 18 and 18' are arranged in the second polymerization zone to heat the polymerized plate-shaped product at a temperature higher than 100° C. for removing the residual monomers. Another method, for example, a method using a hot air oven, may be adopted. Reference numerals 19 and 20 respectively denote a zone for keeping warm and under appropriate conditions the plate-shaped product which has passed through the second polymerization zone and a zone for cooling the plate-shaped product under appropriate conditions. Reference numeral 21 represents a roll for supporting the belts in the zones 19 and 20. It is preferred that this roll 21 be cooled by a cooling fluid. Reference numeral 24 represents the obtained plate-shaped product, that is, the synthetic resin plate.

Figure 7:
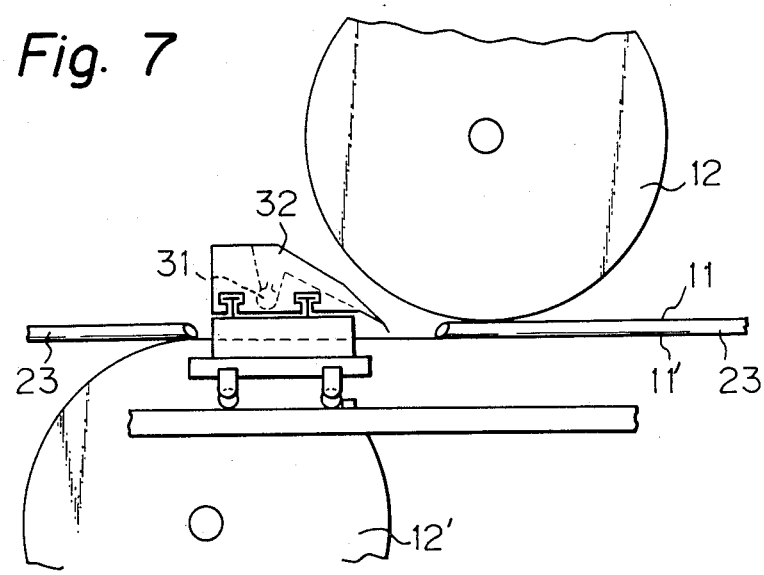
FIGS. 7 and 8 are side and plan views showing an embodiment of the apparatus for injecting liquid materials into a space between confronting belts.
Figure 8:
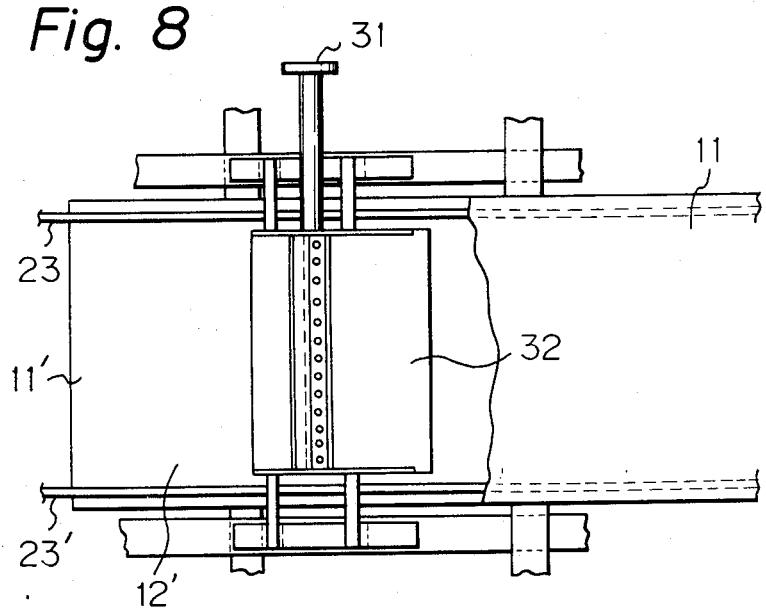

FIG. 7 is a side view showing an embodiment of the apparatus for injecting the liquid materials into the space between the confronting belts. FIG. 8 is a plan view showing this apparatus. In FIG. 7, reference numerals 11 and 11' represent endless belts and reference numerals 12 and 12' represent the pulleys. The liquid materials are passed through the conduit 31 and injected through the injector 32. In order not to disturb the striped pattern, it is preferred that the inclined plate of the injector 32 should have such a width that it is brought close to the inner sides of the gaskets 23 (in FIG. 8) and 23'. Furthermore, in order to control disturbance of the striped pattern, it is preferred that the distance between the top end of the inclined plate and the lower belt 11' be as small as possible, so long as the top end is not brought into contact with the lower belt. It is ordinarily preferred that this distance be adjusted to 3 to 20 mm.

The process of the present invention will now be described in detail with reference to the following examples.

EXAMPLE 1

A methyl methacrylate syrup, that is, a partially polymerized product of methyl methacrylate, having a viscosity of 20 P at 20° C. and a polymerization degree of 24% was mixed with 500 ppm of azobisdimethylvaleronitrile as the polymerization initiator, 100 ppm of an ultraviolet ray absorber and 20 ppm of dioctyl sulfosuccinate as the parting agent to form a liquid material A. The same methyl methacrylate syrup as described above was mixed with 5% of monomeric methyl methacrylate to adjust the viscosity at 20° C. to 14 P, and 200 ppm of an anthraquinone type blue dye was added to the syrup to form a liquid material B. A liquid material C was formed by adding 500 ppm of a cyanine type green dye dispersed in advance in a dispersing medium to the liquid material A.

The liquid materials A, B and C were deaerated under a reduced pressure lower than 70 mmHg and injected at a total flow rate of 12.2 Kg/min at a ratio of 80:15:5 to extrusion opening groups A, B and C, respectively. The extrusion opening groups were arranged as shown in FIGS. 1 and 2. All of the extrusion openings were formed of stainless steel. The first extrusion opening group 1 comprised 24 holes, each having a diameter of 4 mm and a length of 66 mm. The second extrusion opening group 2 comprised 24 holes, each having a diameter of 2 mm and a length of 44 mm. The third extrusion opening group 3 comprised 24 holes, each having a diameter of 2 mm and a length of 22 mm.

The liquid materials were passed through the extrusion openings to form a striped pattern and were passed through conduits connected to the outlet D, and they joined together at the point 31 shown in FIG. 6. Then, the liquid materials were continuously injected between the surfaces of the belts 11 and 11' through the injector 32 shown in the drawings.

Each of the belts 11 and 11' was a polished endless belt of stainless steel having a thickness of 1.5 mm and a width of 1500 mm, and tensions were given to the belts by the main pulleys 12 and 12' and the tensions were adjusted to 10 Kg/cm$^2$ by the hydraulic pressure. The distance between the upper and lower belts 11 and 11' was uniformly adjusted to 3 mm by the rollers 16 and 16' arranged at intervals of 400 mm. A hollow pipe of polyvinyl chloride containing dibutyl phthalate as the plasticizer in an amount of 60% based on the polymer, which had an outer diameter of 8 mm and a thickness of 0.6 mm, was used as the gasket 23. The length of the first polymerization zones 15 and 15' was 66 m, and the belts were heated by spraying warm water maintained at 80° C. from the spray devices 17 and 17' to the back surfaces of the belts. The length of the second polymerization zone was 10 m and the sheet was heated at 135° C. by the infrared ray heaters 18 and 18'. The length of the keeping-warm zone 19 was 10 m, and the belts were travelled within ducts surrounding the belts. The length of the cooling zone 20 was 2 m, and the polymerized and cured plate maintained at a temperature higher than 100° C. at the inlet of the cooling zone was cooled to 100° to 80° C. by an air current and withdrawn from the belts.

In the above-mentioned manner, a synthetic resin plate of different colors composed mainly of methyl methacrylate, which had a width of 1400 mm and a thickness of 3 mm, was continuously obtained. This synthetic resin plate had a beautiful appearance and a pattern of transparent blue and green lines extending from the surface of the colorless transparent plate to the interior thereof in parallel to the direction of advance of the belts, in which the boundary area between the two lines was gradated.

EXAMPLE 2

Processed pigments described below were added to a methyl methacrylate syrup having a viscosity at 20° C. adjusted to 9 P to form a liquid material A. Namely, methyl methacrylate, styrene and barium sulfate were mixed at a ratio of 7:3:20, and 0.2% of benzoyl peroxide was added to the mixture and bulk polymerization was carried out. The obtained polymer was pulverized to obtain a granular processed pigment E. A cadmium sulfide type yellow pigment F was formed by the same processing as described above with respect to the pigment E, and a carbon black type pigment G was formed by the same processing as described above. The processed pigments E, F and G were incorporated into the methylmethacrylate syrup in amounts of 2.5%, 0.03% and 0.0015%, respectively. A liquid material B was prepared by adding the processed pigments E, F and G and a processed pigment H obtained by processing a cadmium sulfide type brown pigment in the same manner as described above with respect to the processed pigments E through G in amounts of 1.0%, 0.38%, 0.24% and 0.28%, respectively, to a methyl methacrylate syrup having a viscosity of 20° C. adjusted to 9 P. The viscosities at 20° C. of the liquid materials A and B were 14 P and 12 P, respectively. Each of the liquid materials A and B was mixed with 500 ppm of azobisdimethylvaleronitrile as the polymerization initiator, 100 ppm of an ultraviolet ray absorber and 50 ppm of dioctyl sulfosuccinate as the parting agent.

The liquid materials A and B were deaerated under a reduced pressure and injected at a flow rate of 8.1 Kg/min at a ratio of 8:2 into extrusion opening groups A and B shown in FIGS. 3-5 by metering pumps. All of the extrusion openings shown in FIGS. 3-5 were formed of stainless steel. The first extrusion opening group 1 comprised 80 circular holes, each having a diameter of 4 mm and a length of 44 mm, and the second extrusion opening group 2 comprised 80 stepped holes, each having a portion having a diameter of 4 mm and a length of 14 mm and a portion having a diameter of 2 mm and a length of 3 mm. Both the liquids A and B were extruded at substantially the same flow rate from the groups of the extrusion openings and they were injected into the continuous polymerization apparatus of the confronting belt type shown in FIG. 6 while forming a linear pattern. Polymerization was effected in this apparatus. Thus, a synthetic resin plate of different colors composed mainly of methyl methacrylate, which had a width of 1400 mm and a thickness of 2 mm, was continuously prepared. This synthetic resin plate had a grained beautiful appearance in which a striped pattern of dense brown lines arranged in parallel to the direction of advance of the belts was formed in the thin brown semitransparent background.

Obviously many modifications and variations of the present invention are possible in light of the above teachings. It is to be understood therefore that within the scope of the appended claims this invention may be practiced otherwise than as specifically described herein.

I claim:
1. An apparatus for preparing a synthetic resin plate having different colors, said apparatus comprising:
   a body;
   a first set of passages extending from an upstream end to a downstream end of said body in a flow direction;
   at least one further set of passages extending into said body in said flow direction from said downstream end thereof, wherein said passages of said first and further set of passages are alternately arranged in a direction transverse to said flow direction;
   means for supplying a first polymerizable liquid material under pressure to said upstream end;
   means for supplying a different further polymerizable liquid material under pressure to each said at least one further set of passages, whereby said first and further liquid materials are extruded from said body as a product having alternating layers of said first and further liquid materials;
   means for forming said extruded product into a layered plate shape;
   means for delivering said extruded product from said body to means for polymerization; and
   means for polymerizing said polymerizable liquid to form a plate-shaped product;
   wherein said body comprises:
   (a) at least two plates forming an array in said flow direction, said at least two plates including an upstream plate and a further plate for each said further set of passages, each said at least one further set of passages extending into said body from said downstream end only so far as one said further plate corresponding to said at least one further set of passages, and
   (b) passage means in each said further plate for connecting a corresponding one said means for supplying a different further polymerizable material to a corresponding one of said further sets of passages, wherein each said passage means comprise a first circumferential passage means communicating with a corresponding one of said means for supplying and a plurality of spiral passage means communicating said first passage means with a corresponding one of said further passages.

2. The apparatus of claim 1 wherein each said set of further passages include at least two passages connected to each said spiral passage along the length of said spiral passage.

3. The apparatus of claim 1 wherein at least one spacer is arranged on either upstream plate or a further plate.

* * * * *